United States Patent

Tanihara et al.

[11] 3,945,033
[45] Mar. 16, 1976

[54] COLOR ELIMINATING CIRCUIT

[75] Inventors: Yozo Tanihara, Kodaira; Masayasu Niimi, Hiroshima, both of Japan

[73] Assignee: Hitachi, Ltd., Japan

[22] Filed: Jan. 10, 1974

[21] Appl. No.: 432,179

[30] Foreign Application Priority Data
Jan. 10, 1973  Japan.................................. 48-5238

[52] U.S. Cl. .................................................. 358/26
[51] Int. Cl.² .......................................... H04N 9/49
[58] Field of Search ....................................... 358/26

[56] References Cited
UNITED STATES PATENTS

| | | | |
|---|---|---|---|
| 3,564,124 | 2/1971 | Popovich .............................. | 358/26 |
| 3,590,147 | 6/1971 | Ong ...................................... | 358/26 |
| 3,711,634 | 1/1973 | Portoulas ............................ | 358/26 X |
| 3,730,982 | 5/1973 | Niimi et al. ......................... | 358/26 X |
| 3,740,461 | 6/1973 | Harwood ............................ | 358/26 X |
| 3,755,618 | 8/1973 | Poppy .................................. | 358/26 |
| 3,772,463 | 11/1973 | Wakai et al. ....................... | 358/26 X |

*Primary Examiner*—Albert J. Mayer
*Assistant Examiner*—Mitchell Saffian
*Attorney, Agent, or Firm*—Craig & Antonelli

[57] ABSTRACT

A color eliminating circuit comprises a killer detection circuit, a band amplifier circuit and a control circuit. The killer detection circuit detects a color burst signal in a chromatic signal applied to an input thereof, and delivers a killer output voltage to the band amplifier circuit. When the killer output voltage is higher than a predetermined operating voltage of the band amplifier circuit, the band amplifier circuit amplifies the chromatic signal supplied thereto; when the killer voltage is lower than the operating voltage, the band amplifier circuit does not amplify the chromatic signal. The control circuit provides a gate pulse for the detection of the color burst signal, which pulse is applied to a further input of the killer detection circuit. When the killer voltage is below the operating voltage of the band amplifier circuit, the control circuit interrupts the provision of the gate pulse, to prevent the killer voltage from being supplied from the killer detection circuit. Thus, where the field strength of received signals is extremely low, an increase in the killer voltage due to noise, which might inadvertently operate the band amplifier circuit, is avoided.

13 Claims, 11 Drawing Figures

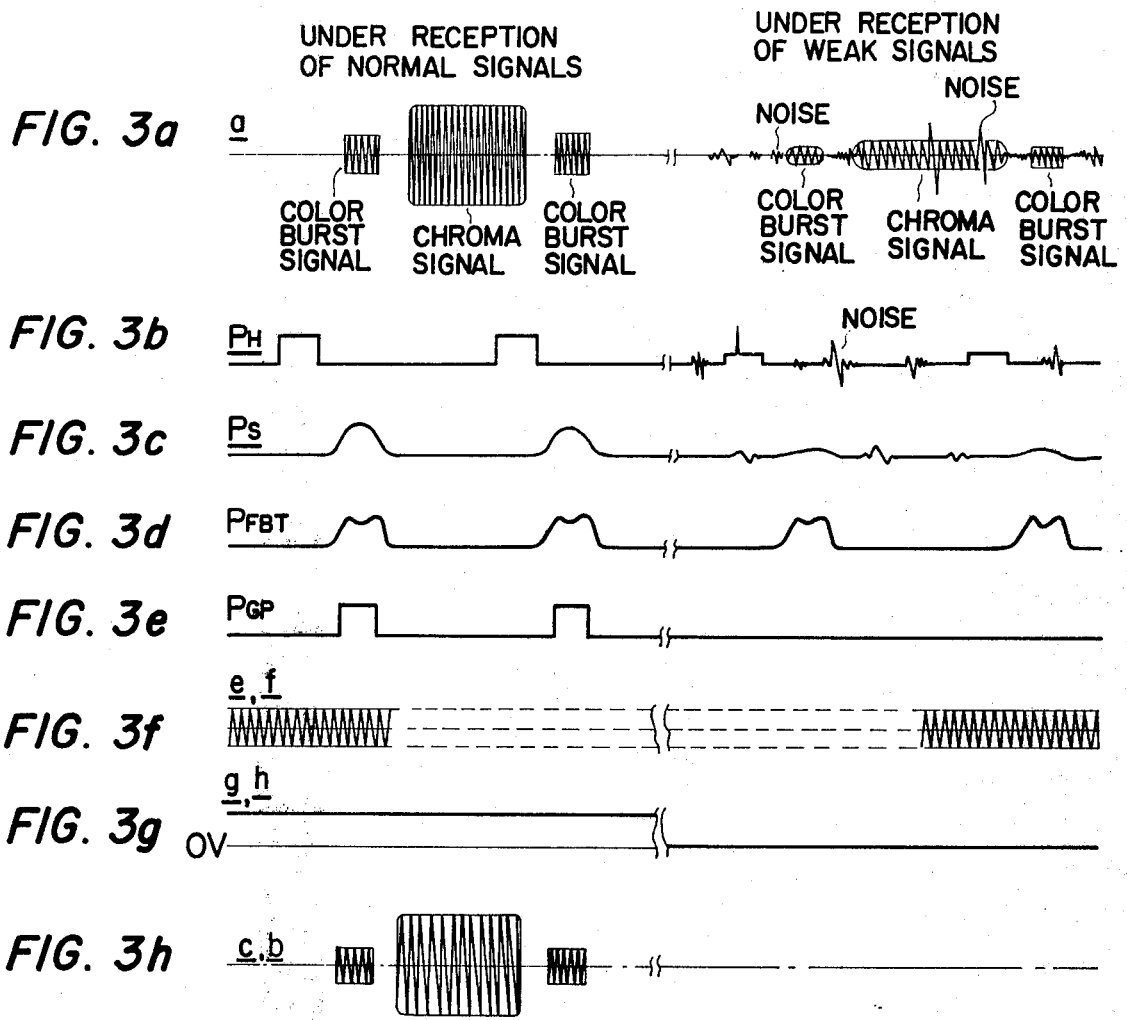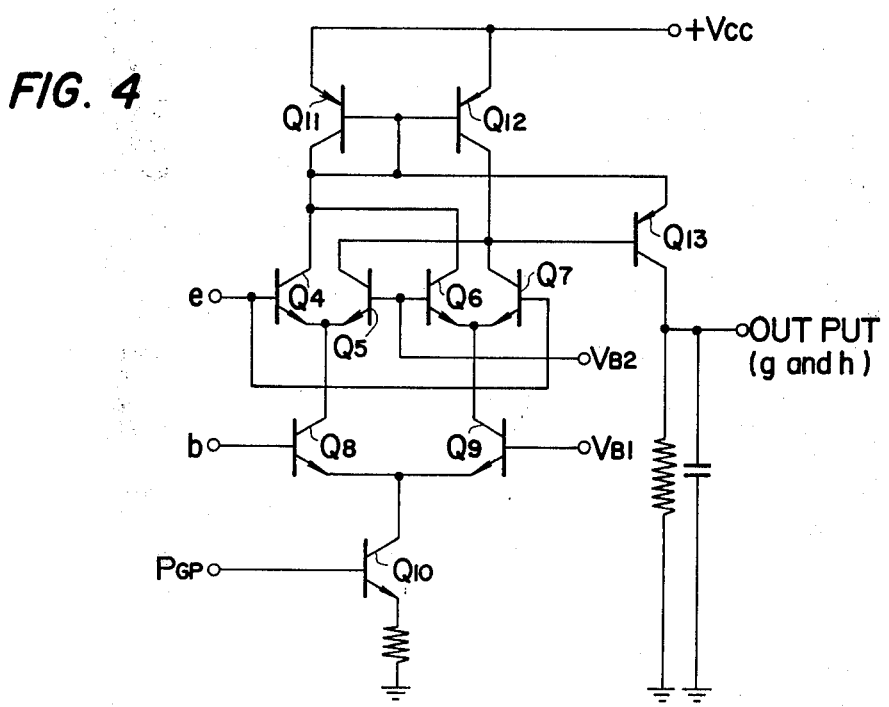

COLOR ELIMINATING CIRCUIT

FIELD OF THE INVENTION

The present invention relates to a color eliminating circuit in a color television.

BACKGROUND OF THE INVENTION

The color eliminating circuit in a color television system is a circuit in which a color burst signal, in a chromatic signal (color signal) derived from a video signal, is detected by a killer detection circuit. Whether the broadcast is a color broadcast or a black-and-white broadcast is discriminated on the basis of the presence or absence of the burst signal, and the amplification function of a band amplifier circuit for amplifying the chromatic signal is interrupted for a black-and-white broadcast free of the burst signal, to prevent any unnatural color from being presented in a black-and-white picture.

In general, the receiving apparatus includes an automatic gain control circuit, and hence, where the field strength of received signals is low, the gain of an input signal is significantly increased, with the result that the amount of noise inevitably increases. Also, in a color television system, where the field strength of received signals has dropped to a low level, demodulation and reproduction of faithful colors are impossible because of the presence of noise, etc., and it becomes difficult to see the color picture. The color eliminating circuit is, therefore, operated so that the amplification function of the band amplifier circuit for amplifying the chromatic signal is interrupted for a color broadcast as in black-and-white broadcasts.

The killer detection output voltage ($V_K$) - versus-field strength of a received electric wave ($E_i$) characteristic of the killer detection circuit employed in present day color eliminating circuits is shown in broken lines $l_o'$ in FIG. 1.

More specifically, the killer detection output $V_K$ is the sum of a component $l_1$ (the one-dot chain line in FIG. 1) obtained by detecting the burst signal in the chromatic signal and a component $l_2$ (the two-dot chain line in FIG. 1) obtained by detecting the noise signal in the chromatic signal. As the field strength $E_i$ of the received signals decreases, the burst component $l_1$ decreases, whereas the noise component $l_2$ increases. Consequently, the killer detection output $V_k$ decreases with the lowering of the field strength $E_i$ of received signals, but when the field strength $E_i$ of the received signals becomes extremely low, the noise component $l_2$ becomes larger than the burst component $l_1$ and the killer detection output $V_k$ increases again.

On the other hand, the band amplifier circuit for amplifying the chromatic signal has its gain controlled by the killer detection output $V_k$, namely the killer voltage, and effects a color elimination operation. At this time, the band amplifier circuit has a predetermined operating voltage $V_{ko}$ relative to the killer voltage $V_k$; it has a high gain and effects chromatic signal amplification upon the application of a killer voltage higher than the operating voltage, and it has a low gain and interrupts the chromatic signal amplification upon the application of a killer voltage lower than the operating voltage, thus effecting a color eliminating operation.

The operating voltage $V_{ko}$, at which the color eliminating operation is effected, is generally set at a low level (the solid line $l_3$ in FIG. 1) and, as previously explained, the amplification function of the band amplifier circuit is interrupted for a black-and-white broadcast; where the field strength of received signals has become low, it is similarly interrupted.

With such a color eliminating circuit, however, where the field strength $E_i$ of the received signals has become extremely low, there is a phenomenon in which the killer voltage exceeds the aforesaid operating voltage $V_{ko}$ due to an increase in the noise component in the chromatic signal, the gain of the band amplifier circuit becomes large, and color noise is present in a picture. Such a phenomenon also occurs where an idle channel, absent a broadcast signal, is selected.

OBJECT OF THE INVENTION

The present invention has been made in order to solve the foregoing problem, and has as an object the removal in a color television system of color noise in a picture where an idle channel or a channel whose field strength of received signals is very low is selected.

BRIEF DESCRIPTION OF THE INVENTION

The fundamental construction of the present invention for accomplishing the above-mentioned object is characterized by a killer detection circuit which has a first control input terminal for applying a gate pulse thereto, an input terminal for applying a chromatic signal thereto and a detection output terminal for delivering a killer voltage. A burst signal in the chromatic signal applied to the chromatic input terminal on the basis of a gate pulse is detected, to provide a killer output signal at the detection output terminal. A band amplifier, which has a chromatic input terminal, a chromatic output terminal and a second control input terminal, is connected to the detection output terminal and when the control signal applied to the second control input terminal is above a predetermined operating voltage, amplifies the chromatic signal applied to said chromatic input terminal to transmit the chromatic signal to the chromatic output terminal. When the control signal is below the aforesaid operating voltage, amplification of the chromatic signal is terminated, to cut off the chromatic signal to be transmitted to the chromatic output terminal. Means is connected to the first control input terminal for cutting off the gate pulse to be applied to the first control input terminal, when the control input signal is below the operating voltage.

The present invention will be concretely described hereunder in connection with an embodiment with reference to the accompanying drawings.

BRIEF DESCRIPTION OF THE DRAWINGS

FIGS. 3a–3h depict wave forms representative of signals at various indexed points of the block and circuit diagram of FIG. 2; and FIG. 4 schematically illustrates an example of the killer detection circuit shown in block form in FIG. 2.

FIG. 2 shows an embodiment of the present invention applied to a system in which killer detection circuit 4 is operated upon the reception of weak signals by a synchronizing signal obtained from a synchronizing signal separator circuit, to cut-off the second band amplifier circuit 2 for amplifying a chromatic signal. An example of the ACC killer detection circuit 4 is shown schematically in FIG. 4. The circuit includes transistors $Q_8$–$Q_{12}$ connected in the illustrated differential connections. To the emitter of each of transistors $Q_8$, $Q_9$, transistor $Q_{10}$, which receives signal $P_{GP}$ to be described hereinafter, is connected. The output (g or h) is derived across the RC network connected to the collector of transistor $Q_{13}$. Inputs e and b are applied as a pair of inputs to the bases of transistors $Q_4$ and $Q_8$. As the detection circuit 4, a circuit described in U.S. Pat. No. 3,730,982 may also be used. Thus, color noises are automatically removed, so that they may be prevented from being applied to the input of a color demodulator circuit 3 upon the reception of weak signals. The waveforms indexed at points a to h, $P_{GP}$, $P_S$, $P_H$, and $P_{FBT}$ are illustrated in FIGS. 3a to 3h.

Figure 1:
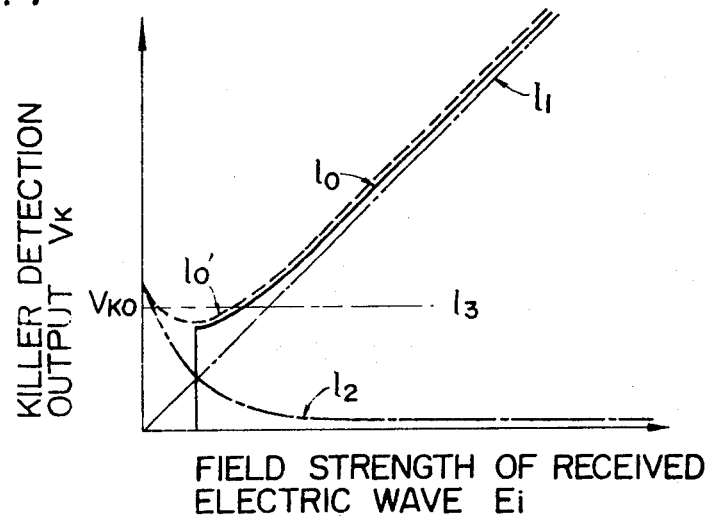
FIG. 1 is a diagram illustrating the detecting characteristics of a killer detection circuit.

With attention now directed to FIGS. 2 and 3a–3h, a first band amplifier circuit 1 subjects the chromatic signal a, shown in FIG. 3a, derived from an input video signal and including a color burst signal, to automatic color signal gain control (ACC) from the output of detection circuit 4 with the burst signal detected, namely the ACC voltage g shown in FIG. 3g. The second band amplifier circuit 2 has its gain controlled and color elimination effected by a killer voltage h, shown in FIG. 3g, obtained from the killer detection 4 of an ouput b of the first band amplifier circuit 1. The color demodulator circuit 3 produces output signals $E_B$, $E_G$ and $E_R$ of the three primary colors in accordance with the output c, shown in FIG. 3h, from the second band amplifier circuit 2 and a color signal subcarrier f, shown in FIG. 3f. A color signal subcarrier oscillator circuit 5 provides color signal subcarriers e and f, shown in FIG. 3f, necessary for synchronous detection of the color burst signal and for color demodulation. The second control circuit 6 provides a gate pulse $P_{GP}$, shown in FIG. 3e, for extracting a color burst signal from the chromatic signal and cuts off the gate pulse $P_{GP}$ when the killer voltage h is below a prescribed operating voltage. The first control circuit 4, namely ACC killer detection circuit as described previously, and exemplified in FIG. 4, extracts the color burst signal from the color signal subcarrier e, gate pulse $P_{GP}$ and chromatic signal b and subjects it to synchronous detection and provides an automatic color signal gain control voltage g (ACC voltage) to the first band amplifier circuit 1. The killer voltage h determines whether the chromatic signal is transmitted or cut off for chromatic signal amplification of the second band amplifier circuit 2.

The second control circuit 6 provides a gate pulse $P_{GP}$ and receives, as an input, the logical product between or summing signal of a pulse $P_{FBT}$, shown in FIG. 3d, of a fly-back transformer and a synchronous pulse signal $P_S$, shown in FIG. 3c, obtained from a horizontal synchronizing signal $P_H$, shown in FIG. 3b, by utilizing a delay circuit composed of an inductance L and a capacitor $C_2$, or the like, and is synchronized with the color burst signal. A gate pulse $P_{GP}$ is delivered as an output. To the base of a transistor $Q_2$ of a differential amplifier circuit including transistors $Q_1$ and $Q_2$ there is applied an appropriate clamp voltage $V_{CL}$ which is higher than a voltage obtained by dividing the synchronous pulse signal $P_S$ by resistances $R_1$ and $R_2$ where the field strength of the received signals is extremely low and which is lower than the divided voltage for normal field strength of received signals.

As is set forth above, in connection with an embodiment of the present invention, its objects can be accomplished as follows.

Figure 2:
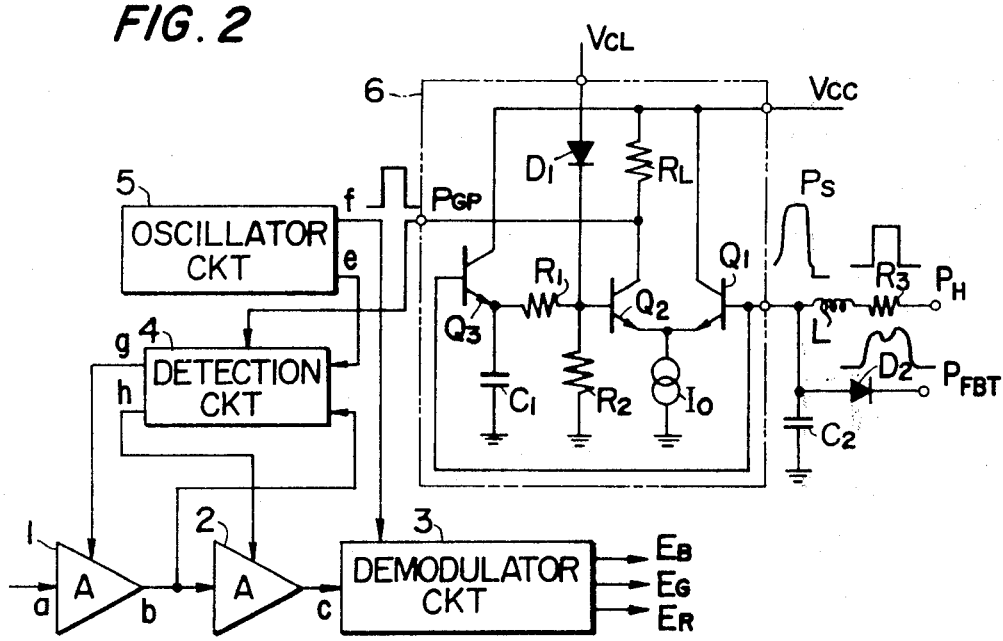
FIG. 2 is a block and circuit diagram of means for demodulating a color signal constructed in accordance with the present invention.

The second control circuit 6, shown in FIG. 2, is a circuit which has a resistance $R_3$, a coil L, a capacitor $C_2$ and a diode $D_2$ in its input circuit, to thereby receive, as an input, the logical product between or summing signal of the fly-back pulse $P_{FBT}$ and the synchronous signal $P_S$ obtained by delaying the horizontal synchronizing signal $P_H$ and synchronized with the burst signal. A voltage with a DC detection output which is divided by resistances $R_1$ and $R_2$, the DC detection output being obtained by detecting the input signal by means of a transistor $Q_3$ and by a filter circuit consisting of the resistances $R_1$, $R_2$ and a capacitor $C_1$, is the base voltage of the differential amplifier transistor $Q_2$. Thus, only when the logical product input exists at the transistor $Q_1$ of the differential amplifier circuit, is the transistor $Q_2$ turned "off," to produce the gate pulse $P_{GP}$ subjected to waveform-shaping.

Accordingly, when the field strength of the received signals has become extremely low, the horizontal synchronizing signal $P_H$ generally increases in pulsating noise, and has a low peak value. At this time, since the predetermined clamp voltage $V_{CL}$ is applied, the base voltage of the differential amplifier transistor $Q_2$ does not decrease below the clamp voltage. Therefore, when the field strength of the received signals has become extremely low, the differential amplifier transistors $Q_1$ and $Q_2$ are respectively placed in "off" and "on" states, and the second control circuit 6 is prevented from providing a gate pulse $P_{GP}$ at its output.

Where the field strength of the received signal has become extremely low, the gate signal $P_{GP}$ is prevented from being impressed on the killer detection circuit and, hence, the killer detection circuit is incapable of effecting the detecting operation, with the result that the killer voltage is not generated. Consequently, when received signals are weak and the noise component in the chromatic signal increases, and the killer voltage increases to exceed the operating voltage for color elimination, the gate pulse is automatically prevented from being applied to the killer detection circuit and, hence, the killer voltage drops to the low values, as shown in FIG. 1, (solid line $l_0$).

Thus, it is possible to prevent an increase in the killer voltage due to noise for an extremely low strength of received electric waves, so that where an idle channel or a channel whose field strength of received signal waves is very low is selected, color noise which might appear in a picture can be removed.

In addition to the foregoing embodiment, the present invention can have aspects of performance as stated below.

Although the embodiment relates to a control system in which the gate pulse is automatically prevented from being applied to the killer detection circuit upon the reception of weak signals, there may also be adopted a system in which the application of the gate pulse is cut-off by the manipulation of a televiewer. The gate pulse is not restricted to a signal which is acquired from the fly-back pulse and the synchronous pulse obtained by delaying the horizontal synchronizing signal, but it may be any pulse synchronized with the color burst signal.

Furthermore, although the killer detection and the ACC detection are generally effected by an identical circuit, the present invention can also be applied for independent circuits, respectively, and it can be applied irrespective of the detection system thereof (synchronous) detection, peak detection by a diode, a transistor or the like).

While we have shown and described one embodiment in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

What we claim:

1. A color eliminating circuit for use in a color television system comprising:
   an amplifier circuit for gating a color signal and subjecting the color signal to controlled amplification;
   a killer detection circuit, connected to said amplifier circuit, for controlling the action of gating and amplification of said amplifier circuit; and
   means, connected to said killer detection circuit and responsive to the level of a received color signal, for causing said killer detection circuit to cut-off the operation of said amplifier circuit when either the level of a received color signal fails to exceed a prescribed level or in the absence of receiving a color signal and the killer detection output of said killer detection circuit exceeds a prescribed operating voltage of said amplifier circuit.

2. A color eliminating circuit according to claim 1, wherein said means comprises a control circuit which generates a pulse for causing said killer detection circuit to extract a color burst signal from the color signal in response to the level of the color burst component of said color signal reaching a prescribed level.

3. A color eliminating circuit according to claim 2, wherein said control circuit includes a differential amplifier circuit having first and second inputs and an output, said first input being connected to receive a selected DC voltage level, said second input being connected to receive a signal representative of the level of said color burst component, and said output being coupled to a control terminal of said killer detection circuit.

4. A color eliminating circuit according to claim 3, wherein said control circuit further includes summing means, connected to the second input of said differential amplifier circuit, for obtaining the sum of a pulse signal synchronized with said color burst component and a signal representative of the level of said color burst component, and means for supplying said sum to the second input of said differential amplifier circuit.

5. A color eliminating circuit according to claim 4, wherein said control circuit further includes a DC detection and wave-shaping circuit connected between the first and second inputs of said differential amplifier circuit.

6. A color eliminating circuit according to claim 5, wherein said DC detection and wave-shaping circuit comprises a transistor having a load, said load comprising an RC network and being coupled with said transistor between the first input and the second input of said differential amplifier circuit.

7. A color eliminating circuit according to claim 4, wherein said summing means comprises a delay circuit connected to receive the horizontal synchronizing signal of said television system, and a diode connected to the junction of said delay circuit and the second input of said differential amplifier circuit and receiving fly-back pulse of said television system.

8. A color eliminating circuit for use in a color television system comprising:
   detection circuit means for detecting a color burst signal in a chromatic signal and issuing a killer output voltage representative thereof in response to a gate pulse being applied thereto;
   amplifier means, connected to said detection circuit means and having a predetermined operating voltage, for subjecting the chromatic signal to controlled amplification in response to said killer output voltage, said amplifier means amplifying the chromatic signal only when said killer output voltage is higher than said operating voltage; and
   control means, connected to said detection circuit means and responsive to an input signal representative of the level of said color burst signal, for generating said gate pulse applied to said detection circuit means only when the level of said input signal exceeds a predetermined DC voltage level.

9. A color eliminating circuit according to claim 8, wherein said control means includes a transistor, means for turning on said transistor to prevent the generation of said gate pulse when said predetermined DC voltage level exceeds the level of said input signal, and means for turning off said transistor to permit the generation of said gate pulse when the level of said input signal exceeds said predetermined DC voltage.

10. A color eliminating circuit according to claim 8, wherein said control means includes a differential amplifier circuit having first and second inputs and an output, said first input being connected to receive a DC voltage level, said second input being connected to receive said input signal, and said output being coupled to said detection circuit means to supply said gate pulse thereto.

11. A color eliminating circuit according to claim 10, further comprising summing means for obtaining the sum of a pulse signal synchronized with said color burst signal and a signal representative of the level of said color burst signal, and means for supplying said sum to said second input of said differential amplifier circuit.

12. A color eliminating circuit according to claim 11, wherein said summing means comprises a delay circuit connected to receive the horizontal synchronizing signal of said television system, and a diode connected to the junction of said delay circuit and said second input of said differential amplifier circuit and receiving a fly-back pulse of said television system.

13. A color eliminating circuit according to claim 11, wherein said control means further includes a DC detection circuit connected between said first and second inputs of said differential amplifier circuit, said DC detection circuit comprising a transistor and a filter, said filter comprising an RC network and being coupled with said transistor between said first and second inputs of said differential amplifier circuit; means for applying said input signal to said transistor and means for applying a clamp voltage to the common connection of said first input of said differential amplifier circuit and said DC detection circuit.

* * * * *